April 2, 1935. W. L. FRY ET AL 1,996,575
SEAT CUSHION COVER
Original Filed June 9, 1931  2 Sheets-Sheet 1
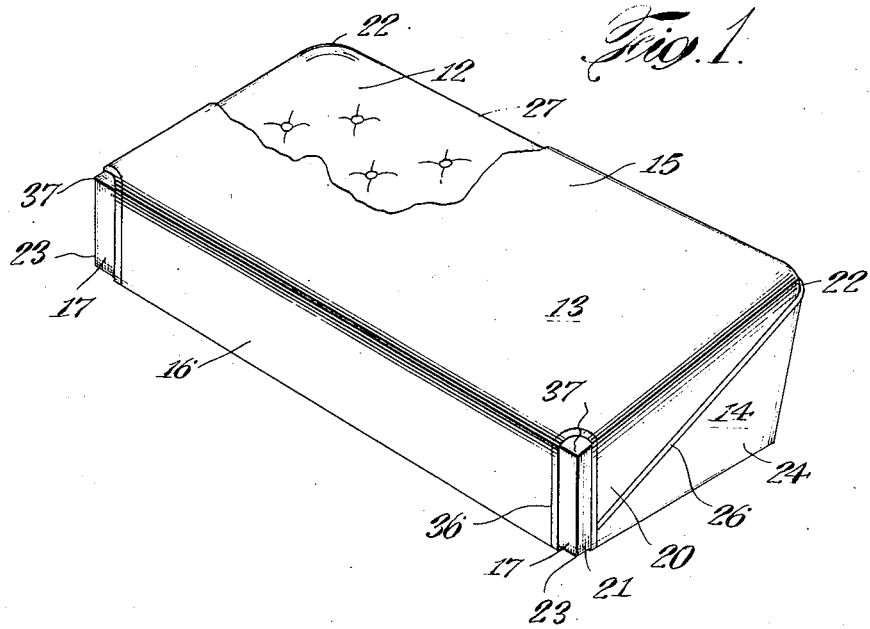
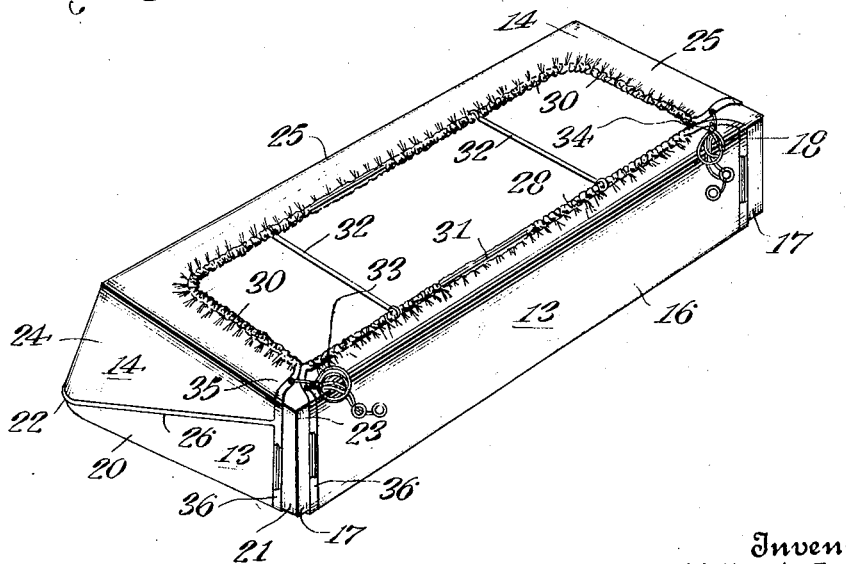
Inventors
Walter L. Fry.
John Brueckl
By their Attorneys April 2, 1935.  W. L. FRY ET AL  1,996,575
SEAT CUSHION COVER
Original Filed June 9, 1931   2 Sheets-Sheet 2
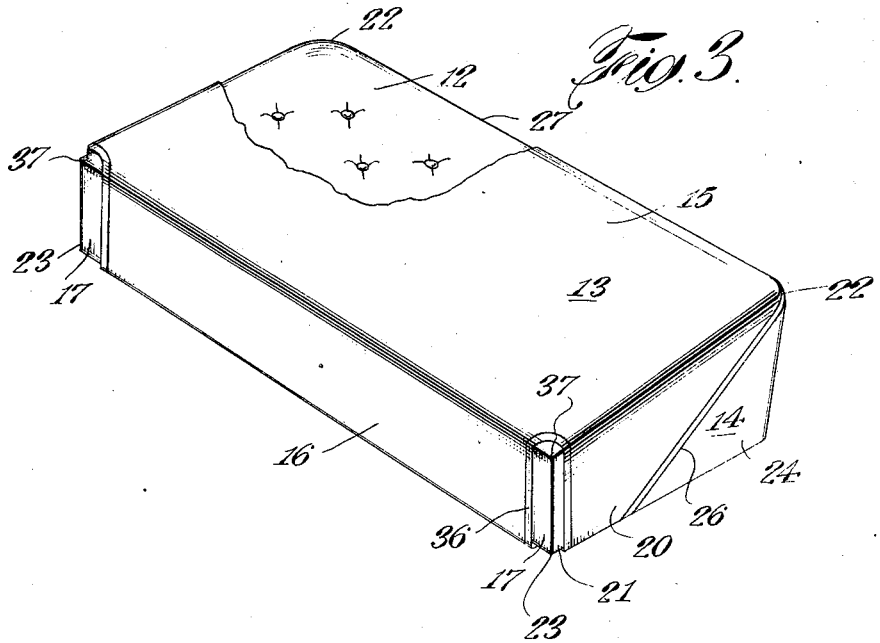
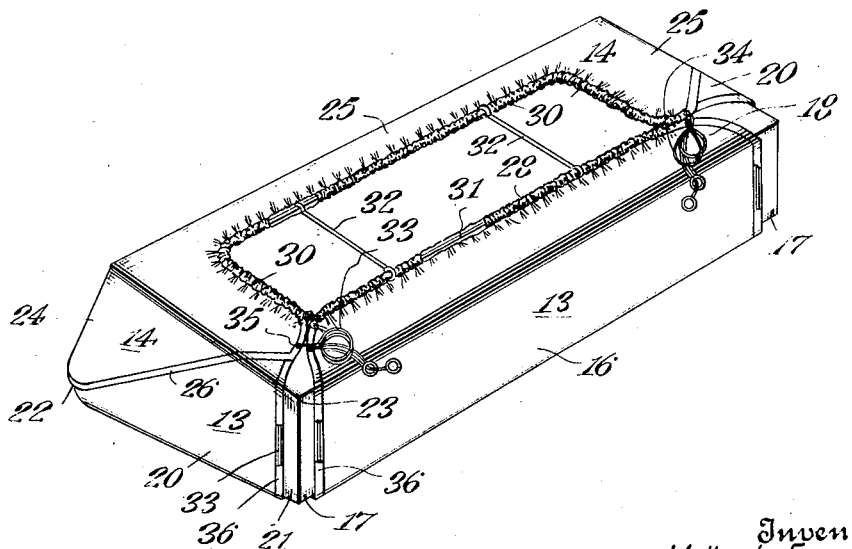
Inventors
Walter L. Fry.
John Brueckl
By their Attorneys Patented Apr. 2, 1935

1,996,575

UNITED STATES PATENT OFFICE 1,996,575

SEAT CUSHION COVER

Walter L. Fry, Scarsdale, N. Y., and John Bruckl, Union City, N. J., assignors, by mesne assignments, to Milton Loewe, New York, N. Y.

Application June 9, 1931, Serial No. 543,072
Renewed August 24, 1934

4 Claims. (Cl. 155—182)

Our invention relates to seat covers and particularly to improvements in removable or slip covers for the seat cushions of automobiles or other vehicles.

Although the seat cushions of automobiles made by a single manufacturer are presumably of a size, they in fact vary to some extent with the various body types. Furthermore, the seat cushions of automobiles made by different manufacturers vary considerably in size and shape. As a result, it is difficult to manufacture a seat cushion cover which fits more than one size of seat cushion. Consequently, department stores, accessory and other dealers selling slip covers for automobiles have heretofore had to carry a large stock of covers, oftentimes having to carry one line for each make of car. In many instances it has further been necessary to carry differently sized covers made up to fit the seat cushions of the several body types of cars of the same make.

Again, it sometimes happens that slip covers made up early in the year in accordance with the announced dimensions of the seat cushions of the various body types of a particular make of car do not fit neatly on the cushions of the same type of car of the same make at a later period of the year because of unannounced changes which have been made during the year in the size and shape of the cushions and embodied in cars of later manufacture. This is oftentimes so although the design of a car as a whole is not materially changed. Obviously, such conditions result in rendering the dealers' stock of covers obsolescent before sold, although the covers were designed to fit the cushions of the cars manufactured earlier in the season.

These variations in the sizes of seat cushions, as set forth above, and changes in the design of the seat cushions during the year, also cause annoyance to car owners who purchase covers since it frequently happens that the purchased cover is a poor fit, wrinkles badly, does not look well on the cushions, and is otherwise unsatisfactory.

Our invention is intended to overcome these difficulties and produce a cover which will approximately fit a wide variety of seat cushions with provision for easily securing the slip cover in place and making the approximate fit accurate without alteration of the cover. It is not alleged that a single cover made in accordance with our invention fits each and every possible size of seat cushion. However, provision is made so that a single cover neatly fits seat cushions which vary considerably in size from an ideal cushion for which the cover was designed. As a result, we make it possible to considerably reduce the number of different sized cushion covers which a dealer must carry in stock to be able to satisfy his customers by supplying covers which accurately fit the cushions of all makes of cars and all body types and models of the same make.

With the above conditions and objects in view, we preferably form our cushion cover of two irregularly shaped sections of suitable fabric. One section has a portion for covering the cushion top, a flap portion for covering the rear face and two wing portions for partially covering the side faces of the cushion. The other section has a portion for covering the front face and wing portions which are complements of the wing portions of the first section for covering the side faces. The edges of both sections extend beneath the cushion and are provided with hems encasing an elastic member for drawing the edge portions of the cover toward the centre of the underside of the cushion. Other elastic members extend transversely of the underside of the cushion and engage opposite edge portions of the cover for drawing it over the top, front and rear faces of the cushion.

The flap and wing portions are slightly narrower than the rear and side edges, respectively, of the cushion, so that the removable cover is in effect a casing having openings at the rear corners of the cushion. The edge portions of the cover adjacent the rear corners of the cushion have hems enclosing drawstrings for drawing the cover snugly over the cushion and securing it in place thereon.

In the drawings:

Figure 1 is a perspective view of a seat cushion having our slip cover applied thereto.

Figure 2 is a perspective view showing the cushion reversed to further illustrate the construction of our cover.

Figures 3 and 4 are perspective views similar to Figures 1 and 2, but showing our cover applied to a cushion of a different size.

Referring to the drawings, the slip cover for the seat cushion 12 comprises two irregularly shaped sections 13 and 14 of suitable fabric. The section 13 is the larger and comprises a portion 15 for covering the top of the cushion 12, a flap portion 16 extending over the rear face 17 and beneath the cushion as at 18, Figure 2, and two substantially triangular side portions or wings 20, which partially cover the side faces 21 of the cushion. The side edges of the wings 20 extend substantially diagonally across the side faces 21 of the cushion from a point at or adjacent the upper front corners 22 toward the lower rear corners 23 of the cushion.

The smaller section 14 has a portion for covering the front face of the cushion and two substantially triangular shaped side portions or wings 24 for completing the covering of the side faces 21 of cushion 12. The section 14 is of such size that, in addition to covering the front and parts of the side faces 21 of cushion 12, it extends around the lower front edge and lower side edges and beneath the cushion as indicated at 25 in Figure 2.

The upper edge of that portion of section 14 which covers the front face of cushion 12 is joined to the front edge of the top covering portion 15 of section 13. The side edges of the wings 24 of section 14 also extend substantially diagonally of the side faces 21 and are joined to the corresponding edges of the wings 20 of section 13. While the various portions of sections 13 and 14 have been described immediately above as separately joined, it is to be understood that in practice a single seam is preferably utilized to join the meeting edges of sections 13 and 14 of the cover.

The seam between the sections 13 and 14 may be bound with suitable binding material which forms a bead 26 extending across the upper front edge 27 of the cushion and substantially diagonally of the side faces 21 of the cushion from a point at or adjacent the upper front corners 22 toward the lower rear corners 23. The bead 26 extends across the front of the cushion approximately along the corner 27 formed by the meeting edges of the top and front faces of the cushion, thus supplying a neat and finished appearance to the cover along the upper front edge of the cushion. The other edges of sections 13 and 14 are also bound with suitable binding material to give the cover a neat and tailored appearance.

A hem 28 is provided at the edge of the flap portion 16 of section 13 which extends beneath the cushion. The portion 25 of section 14 which extends beneath the cushion also has a hem 30 at its edge. A continuous, elastic member 31 extends through the hem 28 at the edge of section 13 and through the hem 30 at the edge of section 14. The elastic member 31 serves, when the cover is slipped over cushion 12, to draw all those portions of both section 13 and section 14 which extend beneath the cushion toward the centre of the underside of the cushion. This elastic member 31 lies on the underside of cushion 12 in a substantially rectangular loop which tends to contract, thus pulling in all directions on the cover to draw the latter smoothly over the top, front, rear and side faces of the cushion.

Spaced elastic members 32 may extend across the underside of cushion 12. The ends of the elastic members 32 may be connected to opposite loop portions of the member 31, for example, by being provided at their ends with fastening members which engage the hems 28 and 30 and encircle the member 31 in the hems. The elastic members 32 act on opposite cover portions which extend beneath the cushion to draw the cover sections 13 and 14 over the top, front and rear faces of the cushion.

As shown in the drawings, the width of the flap portion 16 of section 13 is slightly less than the width of the cushion at its rear edge. The dimensions of the wing portions 20 and 24 of sections 13 and 14, respectively, paralleling the side edges of the cushion, are slightly less than the side edge dimension of cushion 12, the latter dimensions being the same for the wing portions of sections 13 and 14 so that the rear edges of wings 20 and 24 register. Since the above mentioned dimensions of the sections 13 and 14 are less than the corresponding dimensions of the seat cushion 12, the cover has openings at its rear corners and does not completely enclose the rear corners of the cushion.

At each rear corner of the cushion the sections 13 and 14 are provided with hems at their edges, the hems enclosing drawstrings 33 and 34. The drawstring 33 extends through a hem 35 extending along the edge of the wing 24 of section 14 and thence through a hem 36 extending along the edge of wing 20 and the portion 16 of section 13. Drawstring 34 extends in similar manner through a hem extending along the edges of wing 20, wing 24, and cover portion 16, which lie upon the top, side and rear faces and the undersides of the cushion at the opposite rear corner. The drawstrings 33 and 34 are adapted to be drawn taut for pulling the cover snugly over the cushion and to be tied to hold the cover securely in place on the cushion.

To apply the slip cover to the seat cushion 12 the latter is removed from the seat frame of the car and the cover is pulled over the cushion, the substantially rectangular and expansible opening in the underside of the cover permitting the cover to be applied in this manner. The cover is adjusted so that the bead 26 at the front of the top covering portion 15 lies approximately on the upper front edge 27 of the cushion. The cover is then smoothed over the top, front, rear and side faces of the cushion, the elastic loop member 31 at the underside of the cushion acting to draw all the portions of the cover which extend beneath the cushion toward the center of the underside thereof. The drawstrings 33 and 34, which extend across the rear corners of the top of the cushion, down the rear and side faces adjacent the rear corners and beneath the cushion, are drawn taut to pull the cover snugly over the cushion and are tied to secure the cover in place. The ends of the elastic members 32 are attached to opposite portions of the loop, formed by the elastic member 31 enclosed within the hems 28 and 30, and extending transversely of the underside of the cushion act to draw the cover over the top, front and rear faces of the cushion.

It should be noted that since the cover is open or cut away at the rear corners it may readily be applied to cushions of varying size without resulting in the formation of bunches or wrinkles.

It should also be noted that the drawstrings 33 and 34 which extend across the rear top corners of the cushion and down the rear and side faces adjacent the corners act to pull the top covering portion 15 in all directions toward these corners. Thus, the cover is drawn tightly over the cushion, fits accurately and snugly on the cushion, and presents a neat appearance.

When the cover is applied to a cushion having a lesser depth or thickness than that shown in Figures 1 and 2, a greater part of each wing 24 of section 14 of the cover extends beneath the cushion; in some cases a part at the rear end of each wing 20 of section 13 may also extend beneath the cover. This is illustrated in Figures 3 and 4. Conversely, if the cushion is of greater thickness than that of Figures 1 and 2, a smaller part of each wing 24 of section 14 of the cover extends beneath the cushion. The respective conditions described above also result if the cover is applied to a cushion of greater or lesser width than that of Figures 1 and 2. For example, Figures 3 and 4 might represent the cover as applied to either a cushion of lesser thickness or of lesser width than that of Figures 1 and 2.

In such cases, the portions of bead 26 which extend across the side faces 21 of cushion 12 lie at varying angles relatively to the upper and lower side edges of the cushion, the rear ends of these bead portions lying at various points on arcs described approximately from the upper front corners 22 of the cushion. Thus, in cases where the cushion is of greater depth or width these bead portions approach parallelism with the upper side edges of the cushion and on cushions of lesser depth or width these bead portions may extend beyond the diagonal with their rear ends beneath the cushion.

In the event that the side edge dimension of the cushion to which the cover is applied is less than that of the cushion shown in Figures 1 and 2, a greater part of the front covering portion of section 14 of the cover and the rear face covering portion or flap 16 of section 13 extend beneath the cushion, as at 25 and 18 in Figure 4. Conversely, lesser parts of these cover portions extend beneath a cushion the side edge dimension of which is greater than that of Figures 1 and 2. The above is also true of cushions respectively of lesser or greater thicknesses than that of Figures 1 and 2.

In all cases where the length, width or depth of a cushion varies from that shown in Figures 1 and 2, the elastic member 31 in the hems 28 and 30 compensates for these variations by drawing more of the cover beneath smaller cushions or by permitting expansion of the cover to accommodate larger cushions. In all events the cover is an approximate fit for cushions having dimensions which vary within permissible limits. The openings at the rear corners of the cover permit it to be fitted to various sized cushions without producing bunches or wrinkles. The cover is accurately fitted to particular cushions to which its construction permits it to be adapted within a substantial range, by utilizing the elastic member 31 and the drawstrings 33 and 34 to fit the cover smoothly and snugly over the cushion.

From the foregoing description it will appear, upon consideration, that only a relatively small number of cushion covers of different sizes need be made up and carried in stock in order to fit about all possible sizes of seat cushions. Each of the cover sizes carried fits a number of different sized cushions having dimensions varying to a substantial degree and may readily be adjusted to fit accurately and snugly upon each of such cushions and present a good appearance. As a result the difficulties experienced in this respect by dealers are considerably lessened and car owners are enabled to obtain covers which afford satisfaction by fitting and looking well on the seats.

It should also be noted that when the seat cushion is in place in the car no part of the fastening means for the slip cover is visible. The bead which extends along the upper front edge of the seat cover lends a smart tailored effect to the cover.

While our invention has been described in its preferred form, there are many changes and variations which may be made without departing from the spirit thereof, and we desire to include all such changes and variations within the scope of the appended claims.

We claim:

1. In combination with a seat cushion; a cover provided with cut-away portions adjacent the rear corners thereof, said cover enclosing the top, rear and side faces of said cushion except adjacent the rear corners thereof; means securing the cover upon the cushion including hems at the edges of said cover which extend along the top, rear and side faces of said cushion adjacent said corners; and flexible members in said hems for securing said cover in place on said cushion.

2. A seat cushion cover comprising a top covering portion; a front covering portion; side covering portions which are slightly narrower than the sides of a cushion; a back covering flap which is a narrower continuation of the top covering portion, said cover enclosing the front of a cushion and the top, side and back parts of a cushion except adjacent the rear corners thereof; a continuous hem at the edges of said front and side portions; a hem at the edge of said flap; a single continuous elastic member extending through said hem for drawing the edge portions of said cover toward the center of the underside of a cushion; hems at the edge portions of said cover which extend adjacent said corners; and drawstrings in said last hems adapted to be tied beneath a cushion for drawing said cover smoothly over said cushion and securing the cover thereon.

3. In combination with a seat cushion, a slip cover having portions extending over the top, front, rear and side faces of said cushion, said covering being provided with continuous hems extending across said top face adjacent the rear corners of said cushion, along a side face and along a rear face adjacent said corners, and beneath the cushion adjacent said corners; and drawstrings in said hems for drawing said cover smoothly over said cushion, said drawstrings being secured beneath said cushion to hold said cover in place thereon.

4. In combination with a seat cushion, a removable cover therefor having portions extending over the top, rear and side faces and beneath said cushion; hems at the edges of said cover portions, said hems extending along the side faces of said cushion adjacent the rear corners thereof, across the top face of said cushion from the side edges thereof to the rear edges thereof and along the rear faces of said cushion adjacent said rear corners; and drawstrings in said hems for drawing said top face covering portion in all directions towards said corners for fitting said cover snugly to said cushion.

WALTER L. FRY.
JOHN BRUCKL.